United States Patent [19]
Pfremmer

[11] 3,942,666
[45] Mar. 9, 1976

[54] BALE TRAILER
[76] Inventor: Donald Wayne Pfremmer, Box 181, Harmony, Minn. 55939
[22] Filed: Aug. 21, 1974
[21] Appl. No.: 499,306

[52] U.S. Cl. .................................. 214/518; 214/78
[51] Int. Cl.² .......................................... B60P 1/38
[58] Field of Search......... 214/518, 77 R, 78, 83.26, 214/42 A, 520, 521, 522, 83.3; 198/7 BL

[56] References Cited
UNITED STATES PATENTS

| | | | |
|---|---|---|---|
| 2,762,517 | 9/1956 | Eberly | 214/42 A |
| 3,341,039 | 9/1967 | Cranage | 214/83.26 |
| 3,666,122 | 5/1972 | Youmans | 214/518 X |
| 3,750,900 | 8/1973 | Piercey | 214/522 X |
| 3,841,504 | 10/1974 | Spasuik | 214/78 |

Primary Examiner—Albert J. Makay
Attorney, Agent, or Firm—Merchant, Gould, Smith, Edell, Welter & Schmidt

[57] ABSTRACT

An agricultural vehicle designed to be towed behind a farm tractor for lifting and transporting large cylindrical bales of hay. An inverting fork loader is provided for picking up a bale from the ground and depositing it at the front of the vehicle, which has endless conveyor means for transporting the bales rearwardly. The loader and conveyor are both actuable hydraulically. The vehicle has a tongue or draw bar which may be displaced laterally in either of two directions to cause the vehicle to follow the tractor in an offset fashion. One embodiment of the invention has two conveyors, and the loader may be displaced laterally to deposit a bale on either conveyor. Lateral displacement of the loader is reversely coordinated with lateral displacement of the tongue in this embodiment of the invention.

2 Claims, 9 Drawing Figures

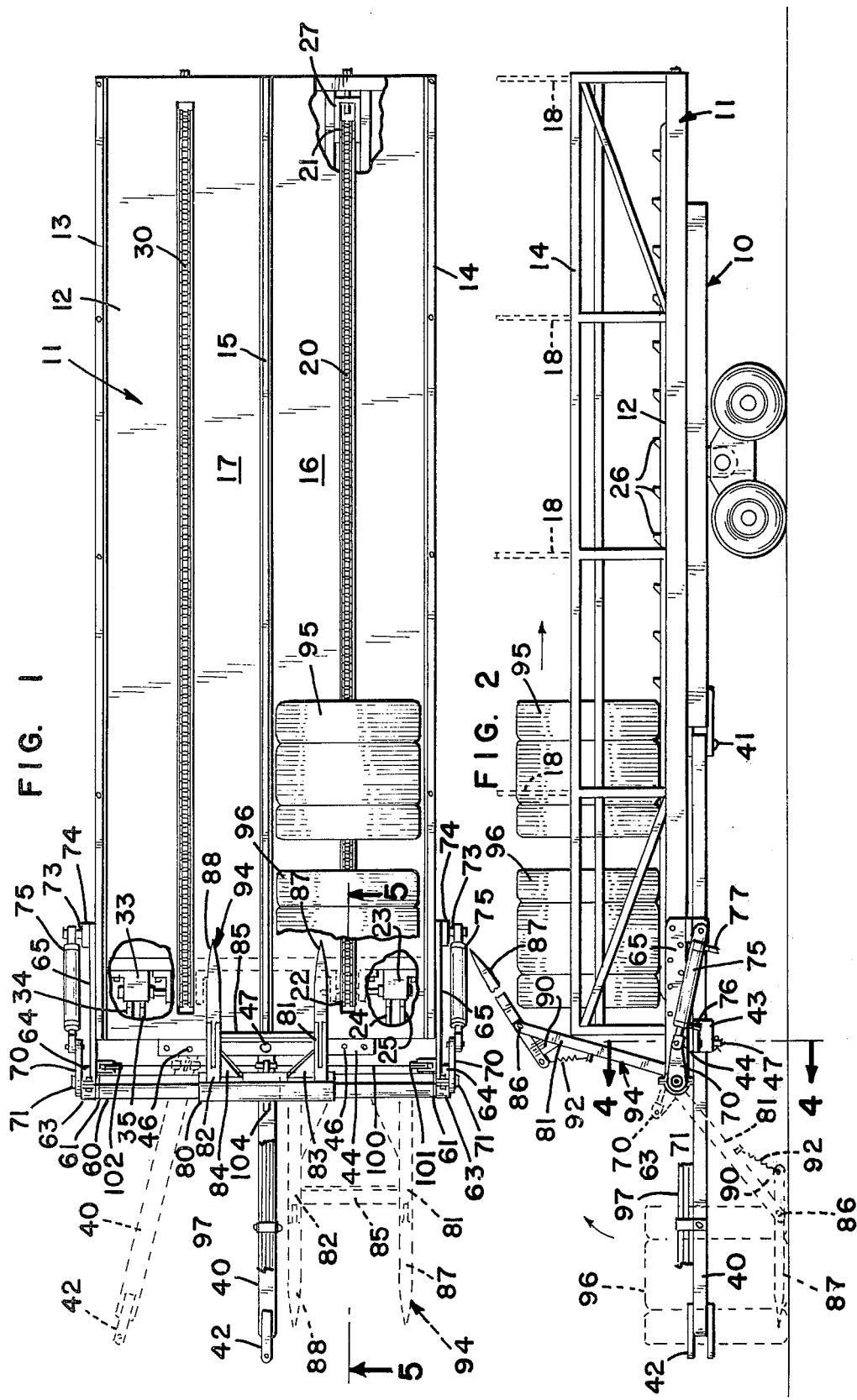

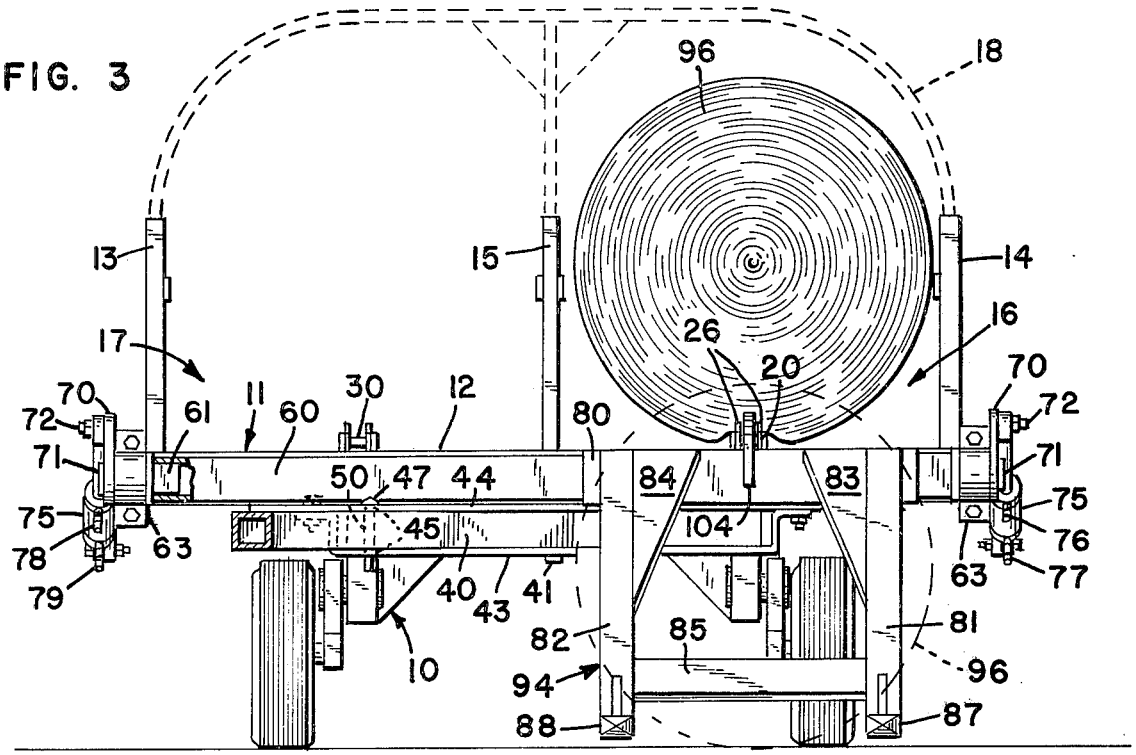
FIG. 3
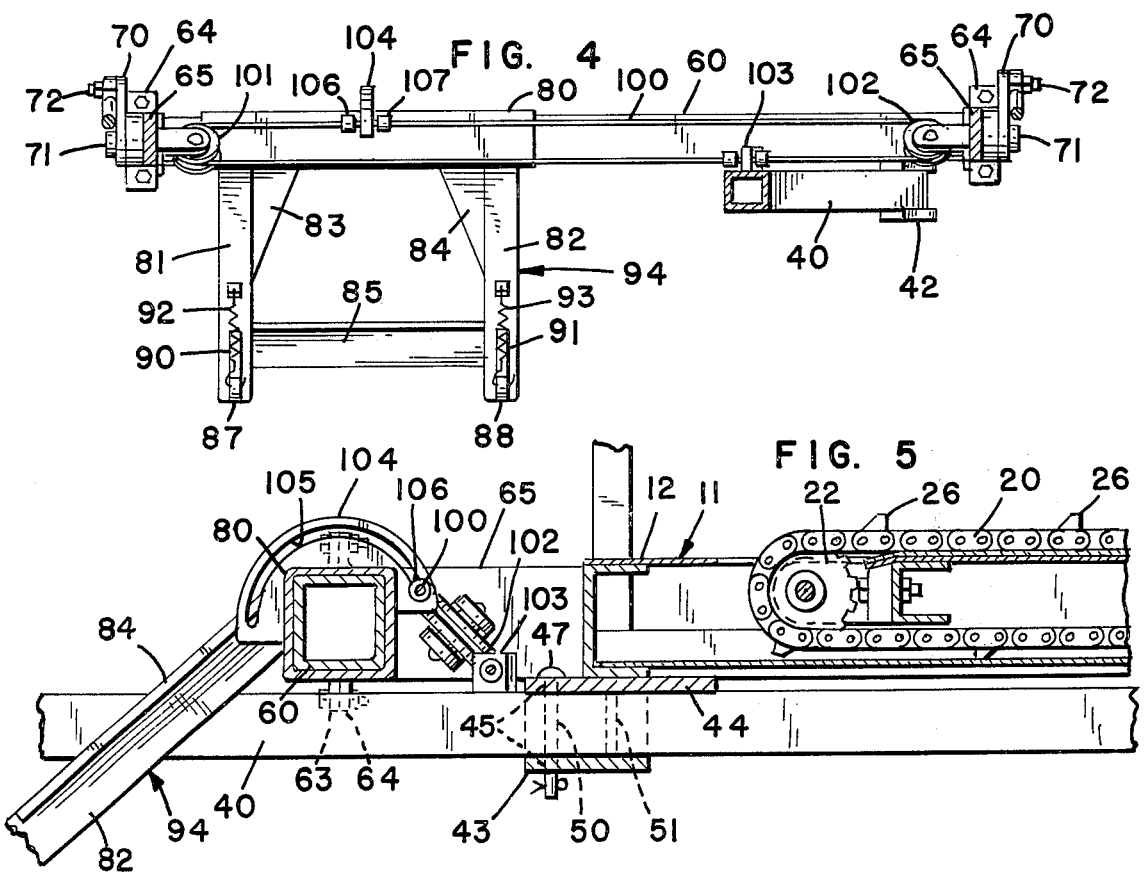
FIG. 4
FIG. 5

BALE TRAILER

BACKGROUND OF THE INVENTION

This invention relates to the field of agricultural machinery, and particularly to apparatus for facilitating the handling of hay in the form of large cylindrical bales about 5 feet in diameter and 4 feet long, as produced by newer hay harvesting machinery. The baling operation is considerably more efficient, tying and so forth being performed once instead of say 25 times for the same weight of hay, and subsequent handling involves one twenty-fifth as many units, but the cylindrical bales weigh about 1500 pounds apiece, are left lying on their sides on the ground by the baler, and do not lend themselves readily to transportation or handling by heretofore conventional means.

SUMMARY OF THE INVENTION

My invention comprises a vehicle, adapted for towing behind a conventional farm tractor, by means of which the tractor operator can load and transport a plurality of these heavy bales without leaving the tractor, and without the help of other workmen. In one embodiment of the invention the vehicle has a central partition and transports up to ten of the bales in two rows of five bales each carried coaxially. The bed of the vehicle has two longitudinal conveyors actuable to transport rearwardly material resting on them: these conveyors are actuated hydraulically. At the front of the vehicle a loader in the form of an inverting fork lift can be positioned to raise a bale from the ground and deposit it on a selected conveyor at the front end of the vehicle: the conveyor then moves the bale rearward by a bale length. The lift is also actuated hydraulically. The tow bar or tongue connecting the vehicle with the tractor is arranged to be offset, and the loader operation is coordinated with the direction of the vehicle offset. A simplified embodiment of the invention provides a narrower vehicle which can receive 5 bales coaxially along its length, and in which the position of the loader is fixed although the tongue is still displaceable to either side.

A principal object of the invention is thus to provide a new and improved agricultural vehicle. Another object is to provide such a vehicle which lifts bales from the ground and deposits them at the front of a conveyor which moves them rearward, all at the control of a single operator. Another object is to provide such a vehicle which will travel offset from the towing vehicle on either side thereof, so that the tractor moves beside the bale to be loaded while the loader engages it. Another object is to provide such a vehicle with a plurality of conveyors on which the loader can selectively deposit the bales. A more specific object is to provide such a vehicle in which displacement of a tongue in one direction to cause offset following by the vehicle automatically displaces the loader in the opposite direction.

Various other objects, advantages, and features of novelty which characterize my invention are pointed out with particularity in the claims annexed hereto and forming a part hereof. However for a better understanding of the invention, its advantages, and object attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing FIG. 1 is a plan view of one embodiment of the invention;

FIG. 2 is a side elevation of that embodiment;

FIG. 3 is a front view of that embodiment, parts being broken away for purposes of illustration;

FIG. 4 is a section taken along the line 4—4 of FIG. 2;

FIG. 5 is a section along the line 5—5 of FIG. 1;

DESCRIPTION OF THE PREFERRED EMBODIMENTS

Figure 6:
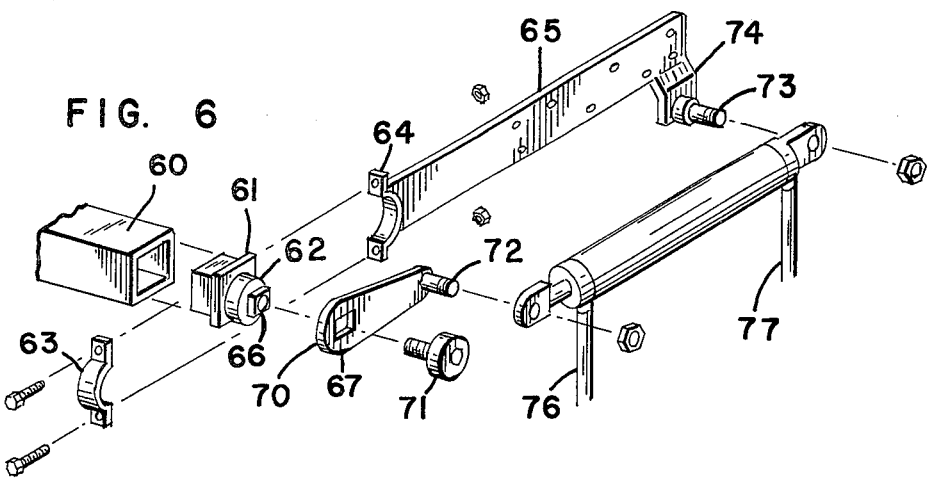
FIG. 6 is an exploded detail of a loading mechanism.

The embodiment of the invention shown as FIGS. 1–6 comprises a wheeled chassis 10 upon which there is mounted an elongated bale transporting body 11 having a bottom 12, side walls 13, 14, and a central longitudinal partition 15 which divides the body into left and right longitudinal sections 16 and 17. Cross reinforcing arches 18 may be provided as at 18 if desired. An endless link coveyor 20 extends longitudinally along the floor of section 16, passing around an idler gear 21 at the rear and a drive gear 22 at the front. Gear 22 is driven by a hydraulic motor 23, having hydraulic connections 24 and 25, in a direction to move the upper reach of the conveyor rearwardly, and the conveyor has a plurality of lugs 26 adapted to engage material resting on the conveyor and transport it rearwardly. Means 27 may be provided for adjusting the tension in conveyor 20. A similar conveyor 30 extends along the bottom of section 17 of the vehicle, and is driven by hydraulic motor 33 having hydraulic connections 34 and 35.

My vehicle is adapted to be drawn by a farm tractor, and for this purpose a draw bar or tongue 40 is pivoted at 41 to the front end of chasis 10, and is provided with a suitable hitch 42. At the front edge of the vehicle tongue 40 is supported by a bracket 43 secured to a cross plate 44 of body 11. Plate 44 and bracket 43 are provided with a central bore 45 and lateral bores 46 through which a pin 47 may pass to engage bore 50 or bore 51 in tongue 40, locking the tongue angularly in a straight ahead position or in right or left offset positions: the tongue is shown in its straight ahead position by solid lines in FIG. 1, and as displaced to the right in broken lines. Similarly the tongue is shown as displaced to the right in FIGS. 4, 5 and 6.

A track 60 is pivotally mounted at its ends of the front of body 11 by means detailed in FIG. 6. A plug member 61 is inserted into the track member and has a trunnion 62 adapted to be received between bearing plates 63 and 64, the latter being a portion of a member 65 secured to the side of the body. The end of plug member 61 is squared at 66 to be received in a square opening 67 in a crank arm 70, which is held to the plug by suitable means such as a bolt 71. A crank pin 72 projects from arm 70, and a pivot pin 73 projects from an offset 74 of member 65. A hydraulic cylinder 75 is mounted on pins 72 and 73, and its stroke is such as to cause rotation of crank arm 70, and hence track 60, through an angle less than 180°: in one embodiment of the invention that angle was 147°. Hydraulic connections are made to cylinder 75 at 76 and 77. The apparatus just described is repeated in mirror image at the other end of track 60, including hydraulic connections 78 and 79.

A carriage 80 is mounted for linear movement along track 70, and carries a pair of arms 81 and 82 suitably braced by gores 83 and 84 and a cross member 85. Arms 81 and 82 are pivoted at 86 to extend at an angle and provide lifting fingers 87, 88 resiliently maintained against supporting inserts 90 and 91 by springs 92 and 93.

Members 60–93 cooperate to comprise a loader 94 in the form of an inverting fork lift transversely movable with respect to the body. The angle between members 86, 87 and members 81, 82 is such that when the former are at ground level they extend generally parallel to the ground. For this condition the crank arms are arranged so that the hydraulic cylinders are in their fully extended conditon. Hydraulic energization of the cylinders then causes clockwise rotation of the crank arms, as seen in FIG. 2, raising members 81, 82 to the position shown in solid lines in FIG. 2, and thus inverting any object carried by the loader and allowing it to drop into the front of the vehicle body where it rests on a conveyor and may be transported rearwardly thereby. FIG. 2 shows in solid lines a first bale 95 which has been loaded and transported rearwardly by one bale length, a second bale 96 just loaded, and the position of the bale 96 before loading.

Means are provided for reversely coordinating the lateral position of loader 94 with the lateral displacement of tongue 40. To this end an endless cable 100 is shown, particularly in FIG. 4, as passing around pulleys 101 and 102 secured slantwise to the insides of members 65 to have an upper reach and a lower reach, the former being located forwardly of the latter. A boss 103 projects upwardly from tongue 40 and is secured to cable 100 in any suitable fashion. A plate 104 oriented normally to the direction of the cable is a part of carriage 80, and includes an arcuate slot 105 through which cable 100 pases. Clamps 106 and 107 grip the cable on opposite sides of plate 104, so that movement of the carriage on track 60 accompanies movement of the cable. The arrangement is such that when tongue 40 is in its straight forward position, carriage 80 is at the center of track 60, and when tongue 40 is displaced to the left or the right, carriage 80 is as a result oppositely displaced, to the right or the left respectively.

Hydraulic power for actuating the cylinders and motors of the vehicle is available at the tractor, where conventional valves for controlling the actuators may be located. A hose assembly 97 supplies the controlled hydraulic fluid to connections 25, 26, 34, 35, 76, 77, 78 and 79 inclusive. The valving is entirely conventional, and may be located at the user's convenience on the tractor, or perhaps at the forward part of the tongue, or elsewhere as desired.

Figure 7:
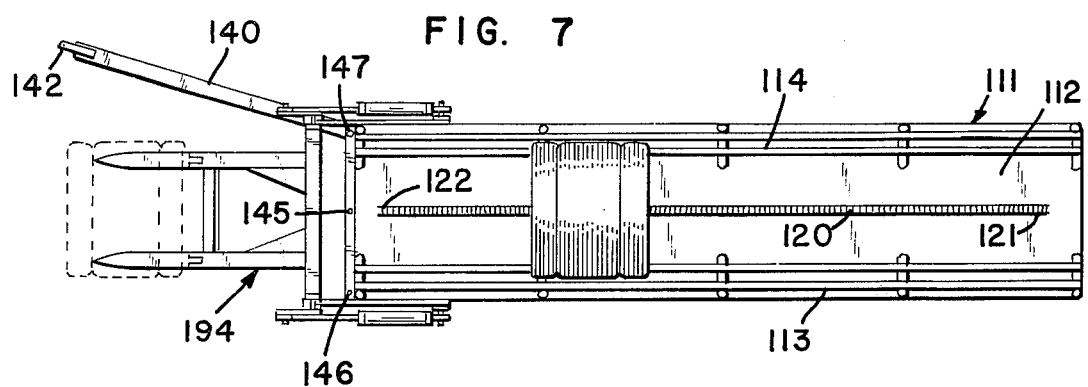
FIGS. 7, 8 and 9 are plan, side and front views of a second embodiment of the invention.
Figure 8:
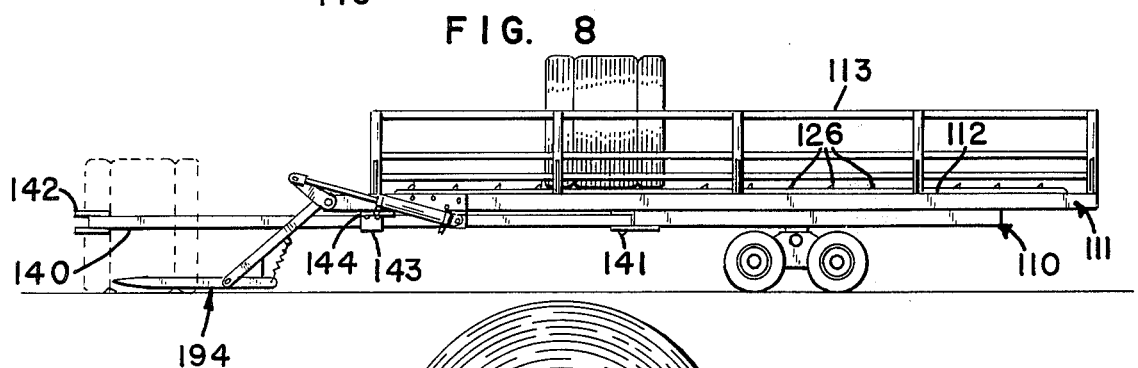
Figure 9:
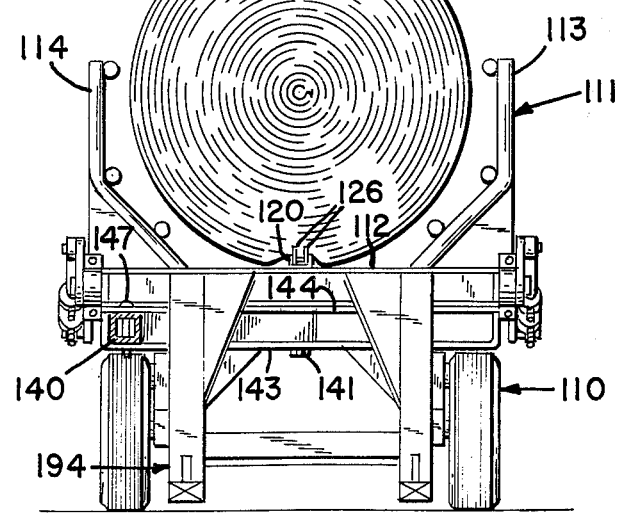

A simplified embodiment of the invention is shown in FIGS. 7–9. It comprises a wheeled chassis 110 upon which there is mounted an elongated bale transporting body 111 having a bottom 112 and side walls 113, 114. An endless link conveyor 120 extends longitudinally of the floor of bottom 112, passing around an idler gear 121 at the rear and a drive gear 122 at the front. Gear 122 is driven by a hydraulic motor like motor 30, in a direction to move the upper reach of the conveyor rearwardly, and the conveyor has a plurality of drive lugs 126 adapted to engage material resting on the conveyor and transported rearwardly.

This vehicle is also adapted to be drawn by a farm tractor and for this purpose a draw bar or tongue 140 is pivoted at 141 to the front end of chassis 110, and is provided with a suitable hitch 142. At the front of the vehicle tongue 140 is supported by a bracket 143 secured to a cross plate 144 of body 111. Plate 144 and bracket 143 are provided with a central bore 145 and lateral bores 146 through which a pin 147 may be passed to engage bores in tongue 140, locking the tongue angularly in a straight ahead positiion or in right or left offset positions.

The loader 194 of this vehicle is exactly the same as loader 94 of the vehicle previously described, except that the fork lift is not adjustable laterally and has no connection with the tongue of the vehicle.

Operation

In use the vehicle is coupled to the tractor both for mechanical draft, by tongue 40, and for hydraulic control, through hose assembly 97. The tongue is in its straight ahead position, and the loader is raised, and is positioned centrally if the vehicle has two load sections. The vehicle is now towed to the field where bales of hay lie on their sides, where the operator displaces tongue 40 to one of its lateral positions, loader 94 being simultaneously positioned for the two section vehicle.

Now the operator drives the tractor toward the first bale to be loaded, and lowers the fork so that members 86 and 87 slide along on the ground or nearly so. Coming up beside the first bale, he moves members 86 and 87 under the bale, parallel to the axis thereof. The hydraulic cylinders are now actuated, and the bale is lifted and inverted, and tumbles off the loader onto the front of a conveyor, lying with its axis aligned therewith. The appropriate hydraulic motor is now energized to convey the bale rearwardly on the vehicle by the length of the bale. The vehicle is now towed to the location of the next bale to be loaded, and the process is repeated.

When one section of the vehicle is loaded the operator reverses the displacement of tongue 40, loader 94 following in a reverse sense, and proceeds to load another five bales. When this is done the tongue is returned to its central position, the vehicle is towed to a storage or utilization area, and the bales are moved off the vehicle at its rear end by conveyor operation.

From the foregoing it will be evident that I have invented a new and improved vehicle for lifting and transporting large cylindrical hay bales under the control of a single operator, using mechanical and hydraulic power available in farm tractors. By its use maximum advantage may be taken of the economics of baling hay in large cylindrical bales.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. An agricultural vehicle for loading and transporting large cylindrical hay bales of known diameter and length, comprising:
    a wheeled chassis;

an elongated bale transporting body mounted on said chassis and including longitudinal walls spaced in accordance with the diameeter of a bale, to divide said body into a plurality of lateral sections, and to prevent the bales from rolling sideways off said body;

conveyor means extending along each section of said body between said walls for transporting material resting thereon rearwardly of said body;

loading means at the front of said body for raising a bale from the ground and depositing it lengthwise on its side on either conveyor means at the front of said body;

means including a tongue pivoted to said body at a location behind the front of said body for setting out of a normal central position into either of two opposite laterally offset positions, to cause continuous lateral displacement of said agricultural vehicle as it moves behind said towing vehicle whereby either body section may be out of line with the towing vehicle and available for front loading;

means for positioning said loading means to deposit bales in a selected one of said channels;

means for actuating said conveyor means and said loading means and means connected to said tongue and said positioning means for automatically positioning the loading means, in accordance with offsetting of said tongue in front of that body section which is clear of the towing vehicle for loading.

2. An agricultural vehicle for loading and transporting large cylindrical hay bales of known diameter and length, comprising:

a wheeled chassis;

an elongated bale transporting body mounted on said chassis and including longitudinal walls spaced in accordance with the diameter of a bale, to divide said body into a plurality of lateral sections, and to prevent the bales from rolling sideways off said body;

conveyor means extending along each section of said body between said walls for transporting material resting thereon rearwardly of said body;

loading means at the front of said body raising a bale from the ground and depositing it lengthwise on its side on either conveyor means at the front of said body;

means including a tongue pivoted to said body at a location behind the front of said body for setting out of a normal central position into either of two opposite laterally offset positions, to cause continuous lateral displacement of said agricultural vehicle as it moves behind said towing vehicle whereby either body section may be out of line with the towing vehicle and available for front loading;

means for positioning said loading means to deposit bales in a selected one of said channels;

means for actuating said conveyor means and said loading means;

means connected to said tongue and said positioning means for positioning the loading means in front of that body section which is clear of the towing vehicle for loading;

said last name means comprising an endless cable extending transversely near the front of the agricultural vehicle about pulleys at each side to have an upper reach and a lower reach;

a track extending transversely at the front of the vehicle;

carriage means mounting said loading means on said track;

means pivotally connecting said tongue to said chassis at a point rearward of said track;

means interconnecting said carriage means with the upper reach of said cable and interconnecting said tongue with the lower reach of said cable so that as said tongue is displaced in one direction said loading means is displaced in the opposite direction;

and means for locking said tongue in a plurality of displaced positions.

* * * * *